United States Patent [19]

Su et al.

[11] 4,401,962  
[45] Aug. 30, 1983

[54] FLEXIBLE THERMALLY STABLE TAPES CONTAINING A HIGH FLASH POINT SOLVENTLESS INSULATING VARNISH

[75] Inventors: Wei-Fang A. Su, Churchill Borough; Frank A. Sattler, Monroeville, both of Pa.

[73] Assignee: Westinghouse Electric Corp., Pittsburgh, Pa.

[21] Appl. No.: 438,425

[22] Filed: Nov. 2, 1982

[51] Int. Cl.³ .............................................. H01F 27/30
[52] U.S. Cl. ............................ 336/205; 174/121 SR; 204/159.19; 428/273; 428/430; 428/480; 525/7

[58] Field of Search ....................... 428/273, 430, 480; 204/159.19; 527/7; 174/121 SR; 336/205

[56] References Cited

U.S. PATENT DOCUMENTS 4,077,925  3/1978  Sattler ..................................... 525/7

Primary Examiner—James J. Bell  
Attorney, Agent, or Firm—D. P. Cillo

[57] ABSTRACT

A tape useful for bonding electrical coils can be made flexible upon cure by using an impregnating varnish composition comprising a blend of (A) an alkyd component reaction mixture containing at least 29 equivalent % of fatty acid, and (B) an alkyl acrylate monomer.

22 Claims, 1 Drawing Figure

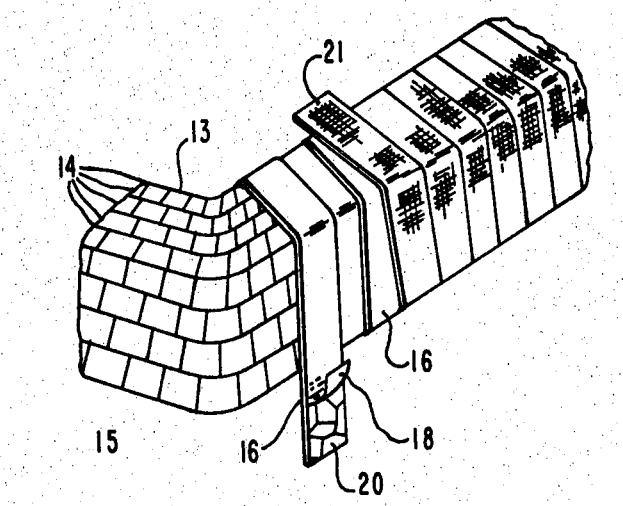

FLEXIBLE THERMALLY STABLE TAPES CONTAINING A HIGH FLASH POINT SOLVENTLESS INSULATING VARNISH

BACKGROUND OF THE INVENTION

Solventless, polyester dipping varnishes, useful for impregnating mica tape already wrapped around electrical coils are well known, and taught by Sattler, in U.S. Pat. No. 4,077,925. The Sattler dipping varnish has a 155° C. to 175° C. insulating capability, a 145° C. to 150° C. flash point, and outstanding pot life properties. That varnish contained an alkyl component having a low equivalent percent of fatty acid and a high equivalent percent of polyhydric alcohol.

While useful as a dipping varnish, the Sattler resin was not completely suitable for impregnating glass fiber wrapping tapes used as a cured, flexible, final bonding for electrical coils; where the impregnating resin requires complete compatibility with glass cloth, very low viscosity, a substantial amount of flexibility, even after baking to cure, and preferably a 180° C. insulating capability. What is needed is a solventless insulating varnish, that will easily wet glass cloth, and provide impregnated glass fiber bonding tapes that are still flexible even after a bake to cure cycle.

SUMMARY OF THE INVENTION

The above problems have been solved, and the above needs met, by providing a flexible, thermally stable, cured substrate, such as a resin impregnated bonding tape, capable of being wrapped around an electrical conductor without cracking or substantial loss of electrical insulating properties. The tape consists of a tough, porous, fibrous material, such as glass cloth or polyethylene terephthalate cloth, impregnated with a high flash point, solventless insulating varnish having a long oil length, imparting flexibility upon cure.

The insulating varnish of this invention consists essentially of a 100 wt.% solids blend of: (1) about 60% to about 90% by weight of an alkyd component consisting essentially of: 48 to 55 equivalent % of a polyhydric alcohol, containing at least a triol, most preferably tris (2 hydroxy ethyl) isocyanurate, and optionally, a diol, such as ethylene glycol; critically, at least 29 equivalent %, preferably from 29 to about 40 equivalent % of an unsaturated fatty acid, such as soybean oil fatty acid; and about 8 to about 20 equivalent % of organic dibasic acid, containing a mixture of unsaturated aliphatic dibasic acid, such as maleic anhydride, and an aromatic dibasic acid, such as isophthalic acid; and (2) about 10% to about 40% by weight of reactive alkyl acrylate monomer having a boiling point over about 200° C. and a molecular weight over about 110, such as trimethylol prepane triacrylate or tetraethylene glycol diacrylate or their mixtures.

These varnishes, when applied to glass cloth tapes, easily wet and impregnate the glass, coat smoothly, and provide outstanding flexibility after impregnation and baking to cure. They show low volatile emissions during coating, i.e., from about 2% to about 8%, have flash points above 200° C., have low viscosities, i.e., below 1,000 cps. at 25° C., have a tank storage life of at least about 2 weeks, are easily baked to provide non-tacky tapes, and have a 180° C. temperature capability without degradation. The impregnated, cured, glass cloth bonding tape made with the varnish of this invention, is very flexible and can be wound around electrical conductors, such as already insulated electrical coils, without fracture, while retaining at least 62% of its electric strength, and can also be used as slot liners and other electrical articles in dynamoelectric machines, such as motors.

BRIEF DESCRIPTION OF THE DRAWING

For a better understanding of the invention, reference may be made to the preferred embodiments, exemplary of the invention, shown in the accompanying drawing, which shows a retain impregnated, mica tape insulated electrical coil being wrapped with the cured, flexible, resin impregnated outer bonding tape of this invention.

DESCRIPTION OF THE PREFERRED EMBODIMENTS

Polyester resins are produced by heating the component polyhydric alcohols, acids and unsaturated fatty acid at between about 150° C. to about 240° C., for about 5 hours to about 10 hours, under an inert blanket of carbon dioxide or nitrogen. The reaction is followed by measurement the acid number, i.e., the number of milligrams of KOH equivalent to the acidity present in one gram of resin. The reaction is continued until the acid number goes down to from about 5 to 25. The alkyd component is then cooled below about 120° C. and inhibitor is added. The reacted alkyd component is then dissolved in the reactive monomer, usually at room temperature. The preparation and materials generally used are well known, and reference may be made to *Plastics Materials* by J. A. Brydson, pages 431–450, (1966), herein incorporated reference, for a complete description of their synthesis and properties.

In this invention, the insulating varnish will contain about 60 wt.% to about 90 wt.% of a reacted alkyd component and about 10 wt.% to about 40 wt.% of an alkyl acrylate monomer. The alkyd component will comprise the reaction product of preferably, from 48 equivalent % to 55 equivalent % of polyhydric alcohol of which about 60 equivalent % to 100 equivalent % of the alcohol will be a triol, and 0 equivalent % to about 40 equivalent % of the alcohol will be a diol, preferably 70 to 100 equivalent % of the alcohol will be a triol, and 0 to 30 equivalent % of the alcohol will be a diol, and most preferably, at least 50 equivalent % of the alcohol will be tris (hydroxy alkyl) isocyanurate; critically, 29 equivalent % to about 40 equivalent % of fatty acid having at least one double bond and about 12 to 18 carbon atoms per molecule, and preferably, from about 8 equivalent % to about 20 equivalent % of organic dibasic acid, of which about 10 equivalent % to about 50 equivalent % of the organic dibasic acid will be unsaturated aliphatic acid and 50 equivalent % to about 90 equivalent % will be an aromatic (aryl) acid. This composition will provide a resin that is flexible upon cure.

In one embodiment of the method of this invention, a fatty oil may be reacted with glycerol as the polyhydric alcohol to form a fatty acid monoglyceride. The oil contains 3 fatty acid moieties and 1 glycerol moiety. When this reaction is used in the method of this invention, less glycerol is required in the alkyd reaction. In totaling the equivalent %, the fatty oil is broken down into its fatty acid and polyhydric alcohol components. Thus, to get the total equivalent % of glycerol, the glycerol added as such, and that contained in the fatty oil are added together to equal total glycerol in the alkyd reaction. The same is true with the fatty acids. Thus "polyhydric alcohol" and "fatty acid", here mean the ingredients added as such plus those components present in a fatty acid monoglyceride if such is present.

The term equivalent %, as employed herein, is calculated as follows:

Equivalent % = (M·F)/Sum(M·F), where M is the number of moles of each ingredient, F is the functionality of ingredient and · indicateds multiplication. All ingredients which have reactive groups are considered in the Sum, which serves as the divisor in the formula, whether already reacted or available for reaction when cured. The functional groups are anhydride, carboxyl, and hydroxyl. The polyhydric alcohols may be bifunctional or trifunctional, the dibasic acids will be bifunctional, although trimellitic anhydride should be considered trifunctional, and the unsaturated fatty acids will be monofunctional.

Useful polyhydric alcohols include triols, such as glycerol, trimethylol ethane, trimethylol propane and preferably, tris (hydroxy alkyl) isocyanurate, of which the most suitable and preferred is tris (2-hydroxy ethyl) isocyanurate. It should also be understood that the tautomeric analogs of the isocyanurate compounds such as tris (2-hydroxy ethyl) cyanurate may be employed. Useful optional diols include neopentyl glycol, ethylene glycol, propylene glycol, and 1,4-butanediol. In preferred embodiments, major amounts of tris (hydroxy alkyl) isocyanurate will always be present.

Useful organic, unsaturated aliphatic dibasic acids include maleic acid, maleic anhydride, fumaric acid, and their mixtures. Useful organic, aromatic dibasic acids include isophthalic acid, phthalic acid; phthalic anhydride; terephthalic acid; dimethyl terepthalate; trimellitic anhydride, and their mixtures. Preferably, both types of acid are present. The aromatic acid is a contributor to good high temperature thermal stability of the alkyd component. Unsaturated aliphatic acid must be present to copolymerize the alkyd component with the alkyl acrylate monomers.

Useful unsaturated fatty acids are those having at least one double bond and containing at least 12, generally from about 12 to 18 carbon atoms per molecule. Included are fatty acids of drying oils, which may include up to about 15% of saturated acids, and the term "unsaturated" is used here to include such fatty acids. Examples of unsaturated fatty acid are soybean oil fatty acid, linseed oil fatty acid; tung oil fatty acid; dehydrated castor oil fatty acid; tall oil fatty acid, perilla oil fatty acid and their mixtures.

The corresponding soybean, linseed, tung, dehydrated castor, tall, and perilla fatty acid monoglycerides, may also be used alone or mixed with the fatty acids. These monoglycerides can be prepared, for example, by reacting the drying oil, in a monoglyceride reaction, with glycerol and lead oxide catalysts at about 275° C. This involves an ester interchange reaction, to form a fatty acid monoglyceride.

When monoglycerides are to be used, the amount of glycerol polyhydric alcohol present on a molar basis in the drying oil, must be calculated as part of the glycerol or other polyhydric alcohol to be used in the main reaction to form the alkyd component. The drying oil is composed of 3 fatty acid components and 1 glycerol component, each of which must be added to the other ingredients used in the alkyd reaction when computing the equivalent % of ingredients.

Useful alkyd acrylate monomers, which are added to the alkyl oligomer component described hereinbefore, are those having boiling points over about 200° C. and molecular weights over about 110. These type monomers are less volatile, and cure to tougher, more thermally stable films than styrene or vinyl toluene monomers. Useful alkyl acrylate monomers include hexanediol diacrylate; neopentyl glycol diacrylate (NPGDA); trimethylol propane triacrylate (TMPTA); tetraethylene glycol diacrylate (TEGDA); pentaerythritol triacrylate; 2-ethyl hexyl acrylate (EHA); 2-hydroxy ethyl acrylate; and their mixtures with the first four monomers being preferred.

The blend of these particular types of monomers and alkyd resin provides a flash point of generally about 200° C. or higher. By "flash point" is meant, the lowest temperature at which the composition is an open vessel gives off enough combustible vapors to produce a momentary flash of fire when a small flame is passed near its surface (ASTM D-92).

In addition, accelerators such as, for example, cobalt naphthenate, tertiary butyl perbenzoate; benzoyl peroxide; and methyl ethyl ketone peroxide can be added in amounts effective to act as a reaction catalyst, generally from about 0.02 part to about 1.0 part per 100 parts varnish, including the alkyd and monomer components.

Inhibitors such as, for example, picric acid, benzoquinone, and hydroquinone can be added in amounts effective to prevent gelation at 26° C., generally from about 0.005 part to about 0.5 part per 100 parts varnish. Both the accelerators and inhibitors may be used alone or in mixtures.

Photoinitiators may also be added in amounts effective to initiate and promote polymerization, with ultraviolet light exposure, prior to complete cure with heat, so that only minimal amounts of resin will run off the fibrous tape during baking. Typical photoinitiators well known in the art would include, for example, benezophenone, benzoin methyl ether, benzoin ethyl ether, and the like. They may be used at from about 0.5 part to about 6 parts per 100 parts varnish.

No diluent need be used in the coating varnish of this invention since viscosities are already low enough for good impregnation. The resulting varnish has a viscosity of from about 200 cps. to 1,000 cps. at 25° C. Viscosities over about 1,000 cps. at 25° C. are considered unsuitable for the flexible bonding tape varnish of this invention. The preferred varnishes of this invention will have viscosities below 900 cps. at 25° C.

The preparation of the impregnating varnish comprises addition of the primary ingredients, except the monomer, in the critical ranges described, by blending at a temperature of from about 150° C. to about 240° C., in the presence of an inert gas, until the reaction proceeds to an acid number of from about 5 to 25. The non-aqueous reaction product comprising the alkyd oligomer component is then cooled below about 120° C. This provides an alkyd having a component oil length of over 60%, preferably from 62% to 75%. The alkyd component is then dissolved in the reactive monomer. This provides a non-aqueous varnish having a pot life of about 2 or more weeks. By pot life is meant the number of weeks required for a sample of this varnish to increase in viscosity by a factor of 10, and proceed to form a semi-solid gel having a viscosity of over about 2,000,000 cps. at 25° C. By "% oil length" is meant [(weight of oil)/(resin yield)]·100.

Upon impregnation into a fibrous tape substrate and heating in an oven to a temperature of from about 85° C. to about 155° C., the varnish will gel in about 2 minutes to 4 minutes. Upon further heating over 135° C., and generally from about 150° C. to about 175° C., the varnish will completely cure to a thermoset state in about 10 minutes to 4 hours. When cured it will have a temperature capability of about 180° C., i.e., it will not melt or degrade, at 180° C. after about 40,000 hours of exposure.

These varnishes, when coated on glass cloth (fabric) or the like, baked to cure, and aged for 1 week at 180° C., pass 62% electric strength retention tests, on samples bent around a 0.125 inch mandrel. Drape Flex Stiffness (ASTM D-1388) can range from 6.0 cm. to 8.25 cm., indicating outstanding flexibility and ability of the cured tape to be wound around electrical conductors without cracking or fracture. Values over about 8.5 cm. are unsuitable for bonding tapes. The high fatty acid content of the varnish of this invention, i.e., over 29 equivalent %, provides % oil lengths of from 60% to 75%, and is critical in dramatically and unexpectedly increasing flexibility of the baked, cured, impregnated tape, and in providing lower viscosity resins with superior wetting and coating properties. The relatively low polyhydric alcohol content, i.e., preferably below 55 equivalent %, contributes to lowering baking cure time, eliminating tackiness, of the varnish impregnated tape, and also improving thermal stability.

Referring to the drawing, there is illustrated a coil 13, comprising a plurality of turns of conductors 14. Each turn of the conductor 14 consists essentially of a copper or aluminum bar or wire wrapped with turn insulation 15. The turn insulation 15, preferably is prepared from a fibrous sheet or strip impregnated with a resinous insulation.

Ground insulation for the coil is provided by wrapping one or more layers of micaceous insulation, such as mica paper or preferably a composite mica tape 16 about the turn 14. Such composite tape 16 comprises a pliable backing sheet 18 of, for example, polyethylene terphthalate mat, having a layer of mica flakes 20 bonded thereto. This mica insulated coil can be vacuum-pressure impregnated with a suitable dipping varnish, such as that taught by Sattler in U.S. Pat. No. 4,077,925.

To impart good abrasion resistance, and to secure a tighter insulation, a wrapping of a tough, flexible, fibrous bonding tape 21, such as glass cloth, polyethylene terphthalate cloth, or the like, impregnated with the varnish of this invention is applied to the coil. This bonding tape 21, before wrapping, must be both cured and flexible, requiring a very contradictory set of properties and a critical addition of specific varnish components.

EXAMPLE 1

Four non-aqueous, high flash point, solventless, insulating, bonding tape varnish blends were prepared. The alkyd oligomer component consisted of the reaction product of the following ingredients:

| Sample | % Oil Length | Polyhydric Alcohol$_1$ | Fatty Acid$_2$ Moles | Organic dibasic Acid Mixture$_3$ | Polyhydric Alcohol$_1$ | Fatty Acid$_2$ Equivalent % | Organic dibasic Acid Mixture$_3$ |
|---|---|---|---|---|---|---|---|
| A | 65.0 | 2.14 | 3.60 | 1.00 | 53.4 | 30.0 | 16.6 |
| B | 72.2 | 2.10 | 4.26 | 0.53 | 54.2 | 36.7 | 9.1 |
| C | 67.5 | 2.04 | 1.36 | 0.85 | 53.3 | 30.0 | 16.7 |
| D | 67.9 | 2.46 | 3.60 | 1.00 | 53.4 | 29.9 | 16.7 |

$_1$ = tris (2-hydroxy ethyl) isocyanurate (THEIC), for Samples A and B.
Sample C is a mixture of 1.36 mole (75 equivalent % of the alcohol) of tris (2-hydroxy ethyl)isocyanurate + 0.68 mole (25 equivalent % of the alcohol) of neopentyl glycol (NPG); and
Sample D is a mixture of 1.50 mole (70 equivalent % of the alcohol) of tris (2-hydroxy ethyl) isocyanurate + 0.93 mole (30 equivalent % of the alcohol) of neopentyl glycol (NPG).
$_2$ = soybean oil fatty acid (SOYA fatty acid)
$_3$ = mixture of 0.2 mole (20 equivalent % of the dibasic acid) of maleic anhydride aliphatic dibasic acid (MAA) + 0.8 mole (80 equivalent % of the dibasic acid) of isophthalic acid aromatic dibasic acid (ISO), for Samples A and D.
Sample B is a mixture of 0.106 mole (20 equivalent % of the dibasic acid) of maleic anhydride + 0.424 mole (80 equivalent % of the dibasic acid) of isophthalic acid; and
Sample C is a mixture of 0.17 mole (20 equivalent % of the dibasic acid) of maleic anhydride + 0.68 mole (80 equivalent % of the dibasic acid) of isophthalic acid An example of calculating the equivalent % for Sample A is:

| Ingredient | Grams/mol.wt. | = moles | × funct. groups | = equivalents |
|---|---|---|---|---|
| 1(THEIC) | 560.5/262.0 | = 2.14 | × 3(OH) | = 6.42 |
| 2(SOYA) | 1009.1/280.3 | = 3.60 | × 1(COOH) | = 3.60 |
| 3(MAA) | 19.6/98.2 | = 0.20 | × 2(COOH) | = 0.40 |
| 3(ISO) | 132.8/166.0 | = 0.80 | × 2(COOH) | = 1.60 |

Equivalent % THEIC = 6.42/12.02 = 53.4
Equivalent % SOYA = 3.60/12.02 = 30.0
Equivalent % MAA + ISO = (0.40 + 1.60)/12.02 = 16.6
Within the organic dibasic acid mixture:
Equivalent % MAA of the dibasic acid = 0.4/2.0 = 20%
Equivalent % ISO of the dibasic acid = 1.6/2.0 = 80%

For each sample, a four-neck reaction flask equipped with stirrer, thermometer, nitrogen gas sparge tube and an air condenser was filled with polyhydric alcohol, soybean oil fatty acid, and the isophthalic dibasic acid components of the alkyd oligomer. The ingredients were heated rapidly, with nitrogen sparging, to 180° C. to 230° C., at a rate of 15° C. per hour temperature increase until the mixture was clear. The mixture was then cooled to 190° C. and then the maleic anhydride dibasic acid was added. The reaction was continued at between 190° C. to 205° C. until an acid number of 10 was reached. This alkyd component was then cooled below 80° C. and 2.4 grams of benzoquinone inhibitor was added.

This alkyd component was then dissolved in monomers with catalysts at 25° C., added as shown below, to provide four non-aqueous, solventless varnishes:

| Sample | Alkyd | Reactive Monomer | | Accelerator | |
|---|---|---|---|---|---|
| | | TMPTA | TEGDA | Co | tBP |
| | | grams | | | grams |
| A' | 70 | 15 | 15 | 0.035 | 0.5 |
| B' | 70 | 15 | 15 | 0.035 | 0.5 |
| C' | 70 | 15 | 15 | 0.035 | 0.5 |
| D' | 70 | 15 | 15 | 0.035 | 0.5 |

TMPTA = trimethylol propane triacrylate;
TEGDA = tetraethylene glycol diacrylate;
Co = 6% solution of cobalt naphthenate;
tBP = tertiary butyl perbenzoate These insulating varnishes contained 70 wt.% alkyd component and 30 wt.% reactive monomer. The following tests were made to evaluate the above non-aqueous, 100% solids bonding tape varnishes. A portion of the varnish was poured into a Gardner viscosity tube and the initial viscosity measured. The viscosity tube was placed in a dark chamber and checked periodically for viscosity increase to determine pot life, as described hereinbefore in the specification.

Portions of the varnishes were used as a double dip coating onto 4 mil (0.004") thick style 1610 glass cloth. After each dip the impregnated cloth was pulled through a squeeze bar. After each coat, the impregnated glass cloth was baked at 160° C. for 10 minutes to cure. Volatile emissions were below 8%, as measured by material balance. These cured samples were cut into 2.54 cm × 18 cm. strips and then further baked in a 180° C. forced air over for 7 days to provide aged samples. The aged samples were first bent 180° over a ⅛ inch mandrel; five bends were made 2.54 cm. apart on each sample, and electric strengths were measured in kV., using a pair of spring loaded electrodes insulated to prevent large flashover at values below 12 kV. The electric strengths of nonaged samples were measured by the same manner as the aged samples. The % electric strength retention was then determined by dividing the average kV. of the aged samples by the average kV. of the nonaged samples.

Additionally, the varnishes were twice dip coated onto 4 mil thick style 1610 glass cloth using a squeeze bar as described before. After each coat, the impregnated glass cloth was baked at 160° C. for 10 minutes to cure. The cured glass cloth was then cut into 2.54 cm. × 18 cm. strips. Stiffness tests were then run, i.e., Drape Flex Stiffness Test (ASTM D-1388). The Drape Flex Stiffness Test, standard in the industry, employs an instrument that consists of a planar portion with a graduated linear scale ending with a 45° slope of the instrument. A sample is placed on the planar portion and moved forward until the sample is at a drape that is parallel with the slope of the instrument. The position of the terminal end of the strip remaining on the plane of the instrument is taken as the test reading. A reading of from about 2 cm. to 7.5 cm. is considered very flexible, from about 7.5 cm. to about 8.25 cm. is considered flexible, from about 8.25 to 10 cm. is considered stiff. The results of these tests are shown below in Table 1:

TABLE 1

| Sample | Flash Point °C.* | Viscosity cps. at 25° C. | Pot Life weeks at 25° C. | % Electric Strength Retention | Stiffness Drape Flex cm. |
|---|---|---|---|---|---|
| A' | >200 | 900 | 2–3 | 68.4 | 7.4 |
| B' | >200 | 440 | 2–3 | 69.1 | 6.5 |
| C' | >200 | 540 | 2–3 | 62.5 | 8.0 |
| D' | >200 | 400 | 2–3 | 62.8 | 7.5 |

*Measured by ASTM-92, varnish gelled at approximately 170° C. before flash.

The bonding tape varnish of this invention had good compatibility with glass cloth. As can be seen from the table, the varnish had very low viscosity, high flash point, good pot life, excellent flexibility after baking, and good % electric strength retention. Additionally, all of these varnishes have 180° C. insulating capability. None of the samples cracked during bending in the various tests. Glass cloth impregnated with Sample A and B varnish has been wound around insulated electrical conductors as a bonding tape, and would provide excellent abrasion resistant, insulating, flexible bonding tape for electrical coils.

Other polyhydric alcohols, fatty acids and organic dibasic acid mixtures set forth hereinabove as part of this invention, used in amounts set forth hereinabove, would provide equally outstanding result.

COMPARATIVE EXAMPLE 2

Two comparative non-aqueous solventless varnish blends were prepared. The alkyd oligomer component consisted of the reaction product of the following ingredients:

| Sample | % Oil Length | Polyhydric Alcohol$_1$ | Fatty Acid$_2$ Moles | Organic dibasic Acid Mixture$_3$ | Polyhydric Alcohol$_1$ | Fatty Acid$_2$ Equivalent % | Organic dibasic Acid Mixture$_3$ |
|---|---|---|---|---|---|---|---|
| E | 58.7 | 1.73 | 2.40 | 1.00 | 54.1 | 25.0 | 20.9 |
| F | 57.5 | 2.67 | 3.33 | 1.00 | 60.0 | 25.0 | 15.0 |

$_1$ = tris (2-hydroxyethy) isocyanurate (THEIC)
$_2$ = soybean oil fatty acid (SOYA fatty acid)
$_3$ = mixture of 0.2 mole maleic anyhdride aliphatic dibasic acid + 0.8 mole of isophthalic acid The equivalent % values were calculated the same way as in Example 1. The reactants were mixed and reacted in exactly the same way as described in Example 1. The alkyd component was then dissolved in monomers with catalysts added as shown below, to provide the two non-aqueous, solventless varnishes shown below:

| Sample | Alkyd | Reactive Monomer | | Accelerator | |
|---|---|---|---|---|---|
| | | TMPTA | TEGDA | Co | tBP |
| | | grams | | | grams |
| E' | 70 | 15 | 15 | 0.035 | 0.5 |
| F' | 70 | 15 | 15 | 0.035 | 0.5 |

TMPTA = trimethylol propane triacrylate;
TEGDA = tetraethylene glycol diacrylate;
Co = 6% solution cobalt naphthenate;
tBP = tertiary butyl perbenzoate These varnishes contained 70 wt.% alkyd component and 30 wt.% reactive monomer. Tests, described in Example 1 were carried out and the results are shown below in Table 2:

TABLE 2

| Sample | Viscosity cps. at 25° C. | % Electric Strength Retention | Stiffness Drape Flex cm. |
|---|---|---|---|
| E' | 1,960 | 62.4 | 8.9 |
| F' | 1,600 | 59.2 | 8.8 |

As can be seen from a comparison of Table 1, the varnishes of this invention, and Table 2, the comparative varnishes; the varnishes of this invention have dramatically lower viscosity without addition of solvents or diluents, have generally better % electric strength retention, and provide a major improvement in flexibility; all this substantially attributable to the substantial increase in equivalent % of fatty acid.

We claim:

1. A tape impregnated with a cured impregnating composition comprising a blend of:
    (A) an alkyd component consisting essentially of the reaction product of:
        (i) polyhydric alcohol comprising polyhydric triol alcohol,
        (ii) at least 29 equivalent % of the alkyd component of fatty acid, and
        (iii) organic dibasic acid, and
    (B) an alkyl acrylate monomer; said tape characterized as being flexible and being capable of being wrapped around an electrical conductor without cracking.

2. A substrate impregnated with a cured impregnating composition comprising a blend of:
    (A) about 60 wt.% to about 90 wt.% of an alkyd component consisting essentially of the reaction product of:
        (i) 48 equivalent % to 55 equivalent % of polyhydric alcohol consisting essentially of:
            (a) about 40 equivalent % to about 100 equivalent % of a triol, and
            (b) about 0 equivalent % to about 60 equivalent % of a diol,
        (ii) 29 equivalent % to about 40 equivalent % of a fatty acid having at least one double bond and containing between about 12 to 18 carbon atoms per molecule, and
        (iii) about 8 equivalent % to about 20 equivalent % of an organic dibasic acid mixture consisting essentially of:
            (a) about 10 equivalent % to about 50 equivalent % of an unsaturated aliphatic dibasic acid, and
            (b) about 50 equivalent % to about 90 equivalent % of an aromatic dibasic acid, and
    (B) about 10 wt.% to about 40 wt.% of an alkyl acrylate monomer having a molecular weight of over about 110 and a boiling point of over about 200° C.

3. The substrate of claim 2, wherein the impregnating composition has a flash point of over 200° C. and a viscosity of from 200 cps. to 1,000 cps. at 25° C.

4. The substrate of claim 2, wherein the substrate is glass cloth and the impregnated substrate is characterized as being flexible and having a temperature capability of about 180° C. without degradation.

5. The substrate of claim 2, as a slot liner for use in a dynamoelectric machine.

6. A tape impregnated with a cured impregnating composition comprising a 100 wt.% solids blend of:
    (A) about 60 wt.% to about 90 wt.% of an alkyd component consisting essentially of the reaction product of:
        (i) 48 equivalent % to 55 equivalent % of polyhydric alcohol consisting essentially of:
            (a) about 40 equivalent % to about 100 equivalent % of triol, and
            (b) about 0 equivalent % to about 60 equivalent % of diol,
        (ii) 29 equivalent % to about 40 equivalent % of fatty acid having at least one double bond and containing between about 12 to 18 carbon atoms per molecule, and
        (iii) about 8 equivalent % to about 20 equivalent % of an organic dibasic acid mixture consisting essentially of:
            (a) about 10 equivalent % to about 50 equivalent % of unsaturated aliphatic dibasic acid, and
            (b) about 50 equivalent % to about 90 equivalent % of aromatic dibasic acid, and
    (B) about 10 wt.% to about 40 wt.% of an alkyl acrylate monomer, said tape characterized as being flexible and being capable of being wrapped around an electrical conductor without cracking.

7. The tape of claim 6, wherein the polyhydric triol in the impregnating composition is selected from the group consisting of glycerol, trimethylol ethane, trimethylol propane, tris (hydroxy alkyl) isocyanurate, tautomeric analogs of isocyanurate compounds and mixtures thereof.

8. The tape of claim 6, wherein the diol in the impregnating composition is selected from the group consisting of neopentyl glycol, ethylene glycol, propylene glycol, 1,4-butane diol and mixtures thereof.

9. The tape of claim 6, wherein the organic, unsaturated aliphatic dibasic acid in the impregnating composition is selected from the group consisting of maleic acid, maleic anhydride, fumaric acid, and mixtures thereof.

10. The tape of claim 6, wherein the organic aromatic dibasic acid in the impregnating composition is selected from the group consisting of isophthalic acid, phthalic acid, phthalic anhydride, terephthalic acid, dimethyl terephthalate, trimellitic anhydride and mixtures thereof.

11. The tape of claim 6, wherein the fatty acid in the impregnating composition is selected from the group consisting of soybean oil fatty acid, linseed oil fatty acid, tung oil fatty acid, dehydrated castor oil fatty acid, tall oil fatty acid, perilla oil fatty acid and mixtures thereof.

12. The tape of claim 6, wherein the alkyl acrylate monomer in the impregnating composition has a molecular weight of over about 110 and a boiling point of over about 200° C. and is selected from the group consisting of hexanediol diacrylate, neopentyl glycol diacrylate, trimethylol propane triacrylate, tetraethylene glycol diacrylate, pentaerythritol triacrylate, 2-ethyl hexyl acrylate, 2-hydroxy ethyl acrylate and mixtures thereof.

13. The tape of claim 6, wherein the impregnating composition contains from about 0.02 part to about 1.0 part per 100 parts impregnating composition of an accelerator effective as a reaction catalyst.

14. The tape of claim 6, wherein the impregnating composition contains from about 0.005 part to about 0.5 part per 100 parts impregnating composition of an inhibitor.

15. The tape of claim 6, wherein the impregnating composition contains from about 0.5 part to about 6 parts per 100 parts impregnating composition of a photoinitiator effective to initiate and promote polymerization, with ultraviolet exposure.

16. The tape of claim 6, wrapped around an insulated electrical conductor.

17. The tape of claim 6, being glass cloth, and wherein the alkyd component in the impregnating composition has a % oil length of from 60% to 75% and the impregnating composition has a flashpoint of over 200° C. and a viscosity of between 200 cps. and 1,000 cps. at 25° C.

18. The tape of claim 6, having the capability of being wrapped around an electrical coil while retaining at least 62% of its electrical strength.

19. The tape of claim 6, having a Drape Flex Stiffness value of from 6.00 cm. to 8.25 cm.

20. An insulated electrical coil wrapped with a flexible tape impregnated with a cured impregnating composition comprising a blend of:
 (A) about 60 wt.% to about 90 wt.% of an alkyd component consisting essentially of the reaction product of:
  (i) 48 equivalent % to 55 equivalent % of polyhydric alcohol consisting essentially of:
   (a) about 40 equivalent % to about 100 equivalent % of triol, and
   (b) about 0 equivalent % to about 60 equivalent % of diol,
  (ii) at least 29 equivalent % of fatty acid having at least one double bond and containing between about 12 to 18 carbon atoms per molecule, and
  (iii) about 8 equivalent % to about 20 equivalent % of an organic dibasic acid mixture consisting essentially of:
   (a) about 10 equivalent % to about 50 equivalent % of unsaturated aliphatic dibasic acid, and
   (b) about 50 equivalent % to about 90 equivalent % of aromatic dibasic acid, and
 (B) about 10 wt.% to about 40 wt.% of an alkyl acrylate monomer having molecular weight of over 110 and a boiling point of over about 200° C., said tape being characterized as being flexible and having a temperature capability of about 180° C. without degradation.

21. A high temperature capability, non-aqueous, impregnating composition comprising a blend of:
 (A) an alkyd component, having a % oil length of from 60% to 75%, consisting essentially of the reaction product of:
  (i) 48 equivalent % to 55 equivalent % of polyhydric alcohol,
  (ii) at least 29 equivalent % of fatty acid, and
  (iii) about 8 equivalent % to about 20% equivalent % of organic dibasic acid, and
 (B) an alkyl acrylate monomer, said composition characterized as having a viscosity of between 200 cps. to 1,000 cps. at 25° C.

22. The composition of claim 21, wherein the alkyd component comprises about 60 wt.% to about 90 wt.% of the composition, the alkyl acrylate monomer comprises about 10 wt.% to about 40 wt.% of the composition, and the composition is characterized as having low volatile emissions of from about 2% to about 8% during coating.

* * * * *